May 8, 1951  W. FRANK  2,552,312
MULTIPLE SLICING DEVICE
Filed Feb. 26, 1948
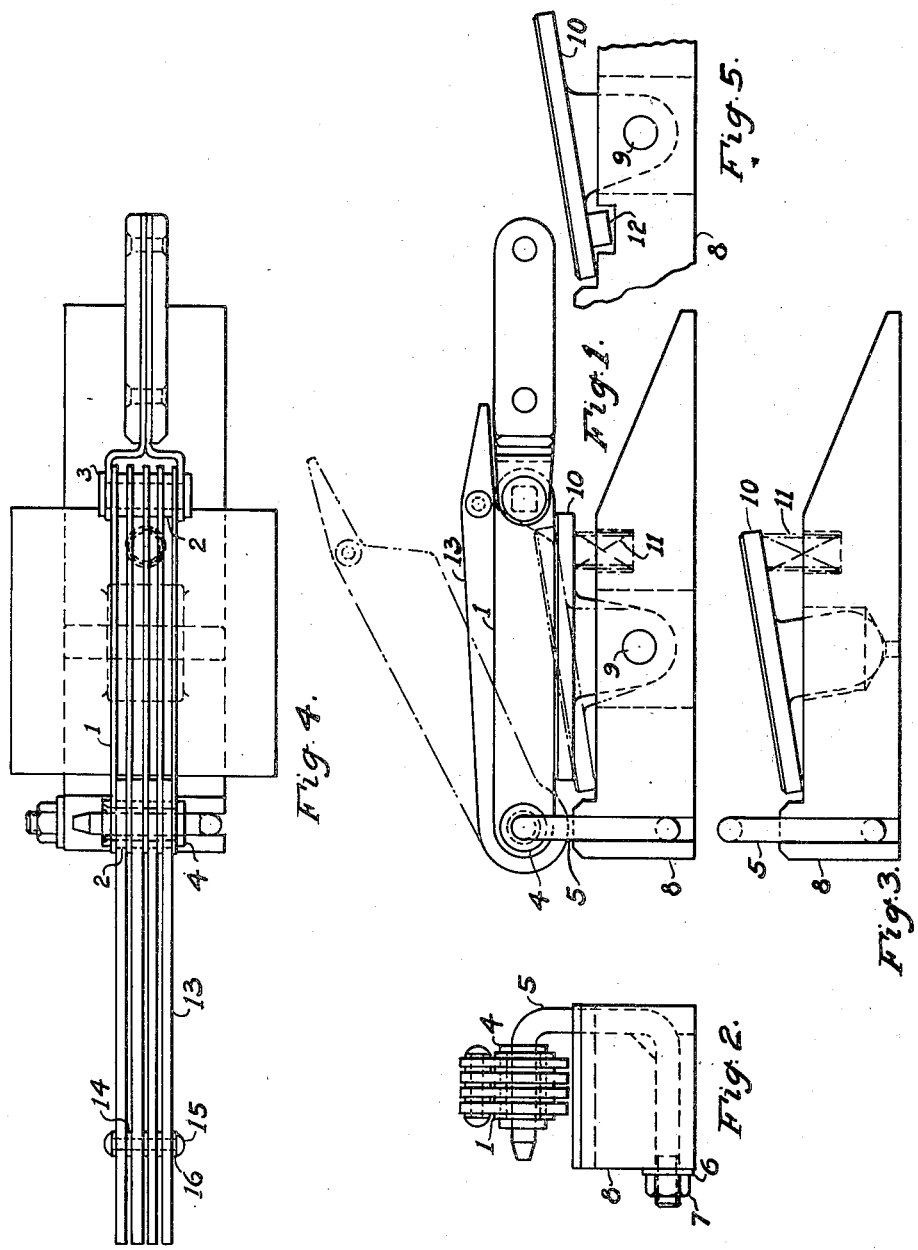
INVENTOR.
William Frank
BY Patented May 8, 1951

2,552,312

UNITED STATES PATENT OFFICE 2,552,312

MULTIPLE SLICING DEVICE

Wilhelm Frank, Detroit, Mich.

Application February 26, 1948, Serial No. 11,239

6 Claims. (Cl. 146—147)

This invention relates to improvements in multiple cutting devices for slicing food or other relatively soft substances.

The objects of the invention are to facilitate manual cutting of substances with a multiedge knife and improve the cutting or dividing operation in its last stage by a small relative sliding motion between cutting edge and cutting material.

Manual cutting with multiedge knives usually requires considerable more strength by the operator than manipulating the common single edge knife as the cutting material offers multiplied resistance not only at the start of the cutting operation but principally in form of friction of the cutting material when sliding past the sides of the blades.

This is accomplished by first, giving the knife a fixed point (at its otherwise free end) around which it can pivot, second, by cutting the material on a rocking table to attain a smooth and complete cutting action.

The improvements can best be shown by describing the views of the accompanying drawing.

Fig. 1 of the drawing shows the full assembly of the cutting device with Figs. 2 and 4 representing end view and plan view respectively. (Stripper shown in "swung back" position in Fig. 4.) Fig. 4 shows the already known multiedge knife assembly in combination with the claimed improvements. The knife may comprise 2 or more blades. (5 blades shown in Figs. 2 and 4.)

For reference purposes some of the parts comprising the already known knife be named and marked as follows: blades 1, separated by spacers 2 at each end, a pin or a bolt 3 to hold blades 1 together at the free end as well as at the end near the handle of the knife.

The multiedge knife is shown in Figs. 1, 2, and 4 resting on table 10. With or without cutting material on its top face, table 10 is held in a tilted position by the pressure of spring 11 or of an overweight 12 acting on one side of table 10. (Figs. 1 and 5.) Cutting pressure applied on the knife, in its last stage of separating the cutting material, will force table 10 to pivot back around fixed pin 9 till the table top rests in its full length against the cutting edge of the knife. (See Figs. 1 and 5.)

To facilitate cutting of material in 2 or more planes table 10 can be shaped so that it can be rotated about its axis; see Fig. 3 with round table 10. The latter has a round stem with a spherical end that rests freely on a conforming seat in base 8 allowing the table free movement about its axis. Enough side clearance is being provided in base 8 to also allow the table 10 (in Fig. 3) to rock in the cutting plane of the knife.

The fixed pivot pin 5 is firmly connected with the base 8 by a nut 7 and a washer 6; see Fig. 2. The free end of pin 5 makes easy placement and removal of the knife possible by providing the latter on its free end with a hollow pin or bushing 4, Fig. 2. At the pivoting end of the knife between the blades 1, riding on spacers 2, a group of leaves, called the stripper, has been provided; see Figs. 1, 2 and 4.

The stripper laminations 13 on their free end are being held together by either screw and nut or just by a pin 15, peened over a washer 16 at both ends, using suitable spacers 14; see Fig. 4.

The cut and separated material lodging between the blades 1 is being pushed out by forcing down the stripper towards the knife handle.

I claim:

1. A slicing device comprising a base, a table pivotally mounted on said base for a limited universal movement about an axis spaced relative to the top face, said table having a top face for supporting materials to be sliced, a knife pivotally connected with said base and movable toward the top face of said table, said base and table having a ball and socket joint therebetween to permit said limited universal swivelling movement of said table relative to said base.

2. A multiple slicing device comprising a base, a table having a top face supporting the material to be cut, said table being mounted on said base and pivotable relative thereto about an axis spaced relative to said top face, a multiple blade secured to said base and pivotable relative thereto toward said table top, said table being normally urged toward a position wherein the surface of said top face thereof is in substantial alignment with the cutting edges of said knife when the latter initially engages the material to be cut, and being pivotable in response to a force exerted by said knife on the material to be cut to maintain a substantial alignment between said cutting edge and said top face during the cutting operation, said base and said table being provided with a ball and socket joint to permit a limited universal swivelling movement of said table relative to said base.

3. A slicing device comprising a base, a table pivotally mounted on said base for a limited universal movement about an axis spaced relative to the top face, said table having a top face for supporting materials to be sliced, a knife pivotally connected with said base and movable toward the top face of said table, means for urging said table into an angular position relative to the cutting edge of the knife at the beginning of the downward knife stroke and to permit movement of said table from an angular position to one of substantial alignment with the cutting edge of said knife when a downwardly directed force is applied on said knife to engage and cut the material on said table top.

4. A slicing device comprising a base, a table pivotally mounted on said base for movement about an axis spaced relative to the top base, said table having a top face for supporting materials to be sliced, a knife pivotally connected with said base and movable toward the top face of said table, means for urging said table into an angular position relative to the cutting edge of the knife at the beginning of the downward knife stroke and to permit movement of said table from said angular position to one of substantial alignment with the cutting edge of said knife when a downwardly directed force is applied on said knife to engage and cut the material on said table top.

5. A slicing device comprising a base, a table pivotally mounted on said base for a limited universal movement about an axis spaced relative to the top face, said table having a top face for supporting materials to be sliced, a knife pivotally connected with said base and movable toward the top face of said table, resilient means for urging said table into an angular position relative to the cutting edge of the knife at the beginning of the downward knife stroke and to permit movement of said table from said angular position to one of substantial alignment with the cutting edge of said knife when a downwardly directed force is applied on said knife to engage and cut the material on said table top.

6. A multiple slicing device comprising a base, a table having a top face for supporting the material to be cut, said table being mounted on said base and pivotable relative thereto about an axis spaced relative to said top face, a multiple blade knife secured to said base and pivotable relative thereto toward said table top, and an overweigth on one side of said table to normally urge said table toward a position wherein the surface of said top face thereof is in substantial alignment with the cutting edges of said knife when the latter initially engages the material to be cut, said table being pivotable relative to said base in response to a forcse thereon exerted by said knife to maintain a substantial alignment between said cutting edge and said top face.

WILHELM FRANK.

REFERENCES CITED

The following references are of record in the file of this patent:

UNITED STATES PATENTS

| Number | Name | Date |
|---|---|---|
| 1,432,892 | Nielsen | Oct. 24, 1922 |
| 1,685,245 | Russo | Sept. 25, 1928 |
| 2,199,589 | Erb | May 7, 1940 |

FOREIGN PATENTS

| Number | Country | Date |
|---|---|---|
| 138,817 | Switzerland | Mar. 31, 1930 |
| 282,407 | Italy | Feb. 10, 1931 |
| 698,419 | Germany | Nov. 9, 1940 |